(12) United States Patent
Ramesh et al.

(10) Patent No.: US 10,831,820 B2
(45) Date of Patent: Nov. 10, 2020

(54) CONTENT BASED IMAGE MANAGEMENT AND SELECTION

(71) Applicant: CLOUDSIGHT, INC., Los Angeles, CA (US)

(72) Inventors: Divya Ramesh, Los Angeles, CA (US); Brad Folkens, Los Angeles, CA (US)

(73) Assignee: CloudSight, Inc., Los Angeles, CA (US)

( * ) Notice: Subject to any disclaimer, the term of this patent is extended or adjusted under 35 U.S.C. 154(b) by 227 days.

(21) Appl. No.: 16/027,156

(22) Filed: Jul. 3, 2018

(65) Prior Publication Data
US 2018/0314715 A1 Nov. 1, 2018

Related U.S. Application Data

(63) Continuation-in-part of application No. 15/179,713, filed on Jun. 10, 2016, now Pat. No. 10,223,454, and
(Continued)

(51) Int. Cl.
*G06K 9/00* (2006.01)
*G06F 16/583* (2019.01)
(Continued)

(52) U.S. Cl.
CPC ...... *G06F 16/5846* (2019.01); *G06F 16/5838* (2019.01); *G06F 16/951* (2019.01);
(Continued)

(58) Field of Classification Search
CPC ............. G06F 16/5866; G06F 16/5838; G06F 16/5846; G06F 16/951; G06F 3/013; G06F 3/017; G06F 3/04842; G06F 16/24578; G06F 16/3334; G06F 16/51; G06F 16/583; G06F 16/93; G06F 16/58; G06F 17/218; G06F 17/2705; G06F 17/277; G06F 17/30268; G06K 9/00671; G06K 9/2063; G06K 9/00288; G06K 9/00684; G06K 9/2081; G06K 9/4604; G06K 9/6201; G06K 2209/25; G06K 9/00751; G06K 9/6253; G06K 9/6263; G06K 2209/01; G06K 9/6274; G06Q 30/0241; G06Q 30/0251; G06Q 30/0282; G06Q 30/0277;
(Continued)

(56) References Cited

U.S. PATENT DOCUMENTS

2013/0138636 A1\* 5/2013 Jin ........................... G06F 16/50
707/723
2017/0200065 A1\* 7/2017 Wang .................... G06K 9/4628
(Continued)

*Primary Examiner* — Tom Y Lu
(74) *Attorney, Agent, or Firm* — Rimon Law

(57) ABSTRACT

Published multimedia including both images and associated text are used to train a neural network, or other machine learning system. The neural network is trained to facilitate the identification and selection of other images for association with other text, and subsequent publishing together in multimedia. The neural network is optionally configured to receive text, or a representation thereof, and generate an image feature vector in response. Embodiments include the use of the trained neural network to select images for publication in multimedia.

19 Claims, 2 Drawing Sheets

Related U.S. Application Data a continuation-in-part of application No. 14/592,709, filed on Jan. 8, 2015, now Pat. No. 9,830,522, which is a continuation-in-part of application No. 14/267,840, filed on May 1, 2014, now Pat. No. 9,569,465, said application No. 15/179,713 is a continuation-in-part of application No. 14/592,885, filed on Jan. 8, 2015, now abandoned, and a continuation-in-part of application No. 14/592,555, filed on Jan. 8, 2015, now Pat. No. 9,575,995, application No. 16/027,156, filed on Jul. 3, 2018, which is a continuation-in-part of application No. 15/067,616, filed on Mar. 11, 2016, now Pat. No. 10,185,898, application No. 16/027,156, filed on Jul. 3, 2018, which is a continuation-in-part of application No. 14/592,797, filed on Jan. 8, 2015, now Pat. No. 10,140,631.

(60) Provisional application No. 62/543,771, filed on Aug. 10, 2017, provisional application No. 62/528,150, filed on Jul. 3, 2017, provisional application No. 62/180,619, filed on Jun. 17, 2015, provisional application No. 61/956,927, filed on May 1, 2013, provisional application No. 61/975,691, filed on Apr. 4, 2014, provisional application No. 61/976,494, filed on Apr. 7, 2014, provisional application No. 61/987,156, filed on May 1, 2014, provisional application No. 62/031,397, filed on Jul. 31, 2014, provisional application No. 62/069,160, filed on Oct. 27, 2014, provisional application No. 62/084,509, filed on Nov. 25, 2014, provisional application No. 62/131,822, filed on Mar. 11, 2015.

(51) Int. Cl.
| | | |
|---|---|---|
| *G06N 3/08* | (2006.01) | |
| *G06T 7/00* | (2017.01) | |
| *G06F 16/951* | (2019.01) | |
| *G06K 9/62* | (2006.01) | |
| *G06F 40/117* | (2020.01) | |
| *G06F 40/205* | (2020.01) | |
| *G06Q 30/02* | (2012.01) | |
| *G06F 40/284* | (2020.01) | |

(52) U.S. Cl.
CPC .......... *G06F 40/117* (2020.01); *G06F 40/205* (2020.01); *G06K 9/6274* (2013.01); *G06N 3/08* (2013.01); *G06Q 30/0241* (2013.01); *G06Q 30/0282* (2013.01); *G06T 7/97* (2017.01); *G06F 40/284* (2020.01); *G06K 2209/01* (2013.01)

(58) Field of Classification Search
CPC ............... G06Q 30/02; G06Q 30/0246; G06Q 30/0257; G06Q 30/0275; H04N 2013/0074; G06N 3/08; G06T 7/97
See application file for complete search history.

(56) References Cited

U.S. PATENT DOCUMENTS

| | | | |
|---|---|---|---|
| 2017/0200066 A1* | 7/2017 | Wang | G06N 3/08 |
| 2018/0267997 A1* | 9/2018 | Lin | G06N 3/04 |

* cited by examiner

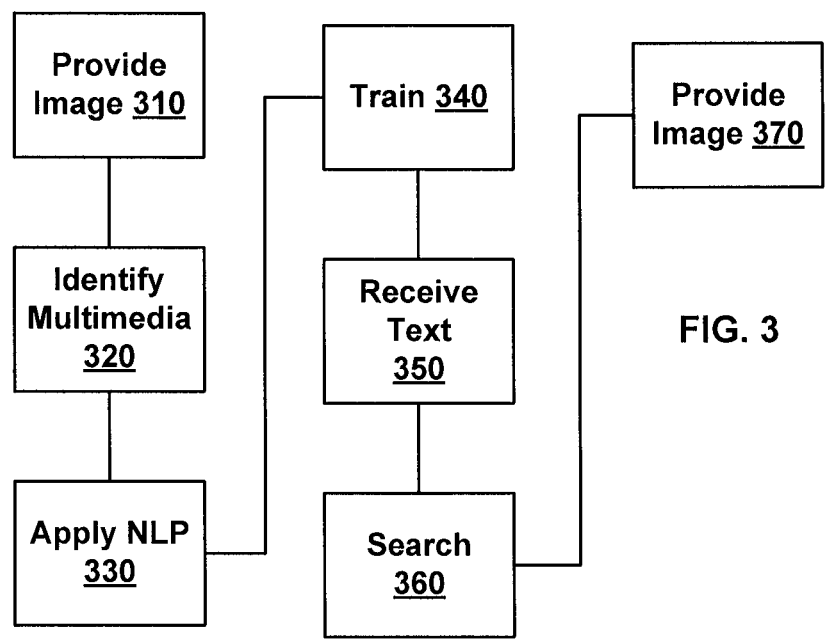

CONTENT BASED IMAGE MANAGEMENT AND SELECTION

CROSS-REFERENCE TO RELATED APPLICATIONS

This application claims benefit and priority of U.S. provisional patent application Ser. Nos. 62/543,771 filed Aug. 10, 2017 and 62/528,150 filed Jul. 3, 2017;

this application is also a continuation-in-part of U.S. non-provisional application Ser. No. 15/179,713 filed Jun. 10, 2016, which in turn is a continuation in part of U.S. non-provisional patent application Ser. No. 14/592,709, 14/592,885 and 14/592,555 each of which were filed Jan. 8, 2015, U.S. non-provisional patent application Ser. No. 14/592,709 is a continuation-in-part of U.S. non-provisional patent application entitled "Image Processing," filed May 1, 2014 and having Ser. No. 14/267,840 which, in turn, claimed priority to U.S. provisional application 61/956,927 filed May 1, 2013;

U.S. non-provisional patent application Ser. No. 14/592,709 further claimed priority to and benefit of the following U.S. Provisional Patent Applications:
Ser. No. 61/975,691 filed Apr. 4, 2014, Ser. No. 61/976,494 filed Apr. 7, 2014,
Ser. No. 61/987,156 filed May 1, 2014, Ser. No. 62/031,397 filed Jul. 31, 2014,
Ser. No. 62/069,160 filed Oct. 27, 2014, 61/956,927 filed May 1, 2013, and
Ser. No. 62/084,509 filed Nov. 25, 2014;

this application is further a continuation in part of U.S. non-provisional patent application Ser. No. 14/592,797 filed Jan. 8, 2015; and this application is further a continuation in part of U.S. non-provisional patent application Ser. No. 15/067,616 filed Mar. 11, 2016, which claims benefit and priority to U.S. provisional patent application 62/180,619 filed Jun. 17, 2015 and U.S. provisional patent application Ser. No. 62/131,822 filed Mar. 13, 2015.

All the above patent applications are hereby incorporated herein by reference.

BACKGROUND

Field of the Invention

The invention is in the field of multimedia content generation, and more specifically in the field of image selection for mixed media content.

Related Art

It is often desirable to combine images and text to produce content for distribution to third parties. For example, it is common for producers of multimedia content, such as blogs, webpages, articles, advertisements, etc., to need images to accompany their writing. Images (still and video) are available from photo stock companies such as Getty Images, Inc. However, the vast number of images can make it difficult to select the most appropriate image for a given project.

SUMMARY

Various embodiments of the invention are configured to observe how images are used by third parties and to train a machine learning system to better search for and select images based on these observations. Once the machine learning system is trained, a sample of text from multimedia content can be used to search for images likely to be used with that text. This search is optionally also based on one or more keywords. The search for images can be based on significant sections of text, e.g., entire sentences, paragraphs or more. This often produces search results that better match a subject matter of the text, relative to results based on a simple keyword search. The use of images by third parties can include use in blogs, webpages, advertisements, articles, and/or other multimedia content.

In some embodiments, an automated image selection system is configured to analyze text and select one or more images for publication in mixed media content that includes both the text and at least one of the selected images. The selection is based on processing of the text and on attribute vectors associated with the images. The automated image selection system optionally includes an image tagging system.

Various embodiments of the invention include an image management system comprising: a library of images; an image search system configured for a third party to select a first image from the library of images, the image search system including a neural network; an image distribution system configured for delivering the selected first image to the third party; tracking logic configured to track inclusion of the selected first image in multimedia content, including both the selected first image and first text; text extraction logic configured to extract the first text from the multimedia content; and training logic configured to train the neural network to select a second image based on second text, the training being based on an association between the extracted first text and the first image.

Various embodiments of the invention include a method of providing images, the method comprising: optionally providing an image to a third party (or alternatively locating an image used by a third party on a webpage, blog, article, advertisement or the like); identifying text associated with the image by the third party, the text and the image being included in multimedia, the text optionally including a sentence, paragraph or larger block of text; optionally applying a natural language processor to identify and/or characterize parts of the text; using the image and identified text to train a neural network, the neural network being trained to identify image likely to be used with text input; receiving a text input from an external source; searching for one or more images using the neural network, based on the received text input, the search optionally further including matching of keywords with image tags; and providing one or more images identified in the searching to the external source.

Various embodiments of the invention include a system for selection of images, the system comprising: a text parser configured to identify tokens within text; text analysis logic configured to identify a subject matter of the text based on the identified tokens; image search logic configured to search a storage of image tags using the subject matter of the text, the image tags being associated with images and the search being configured to identify those members of the image tags that match the subject matter of the text; and image retrieval logic configured retrieve one or more images associated with the identified members of the image tags.

Various embodiments of the invention include a method of creating mixed media content, the method comprising: receiving a plurality of images; generating at least one image tag for each of the images, the image tag characterizing content of the respective image; receiving text; parsing the text to determine a subject matter of the text; searching the image tags to identify members of the image tags that match the subject matter of the text; retrieving at least one image characterized by the identified members; and placing the at least one image and the text in the mixed media content.

BRIEF DESCRIPTION OF THE DRAWINGS

FIG. 3 illustrates a method of managing images, according to various embodiments of the invention.

DETAILED DESCRIPTION

Figure 1:
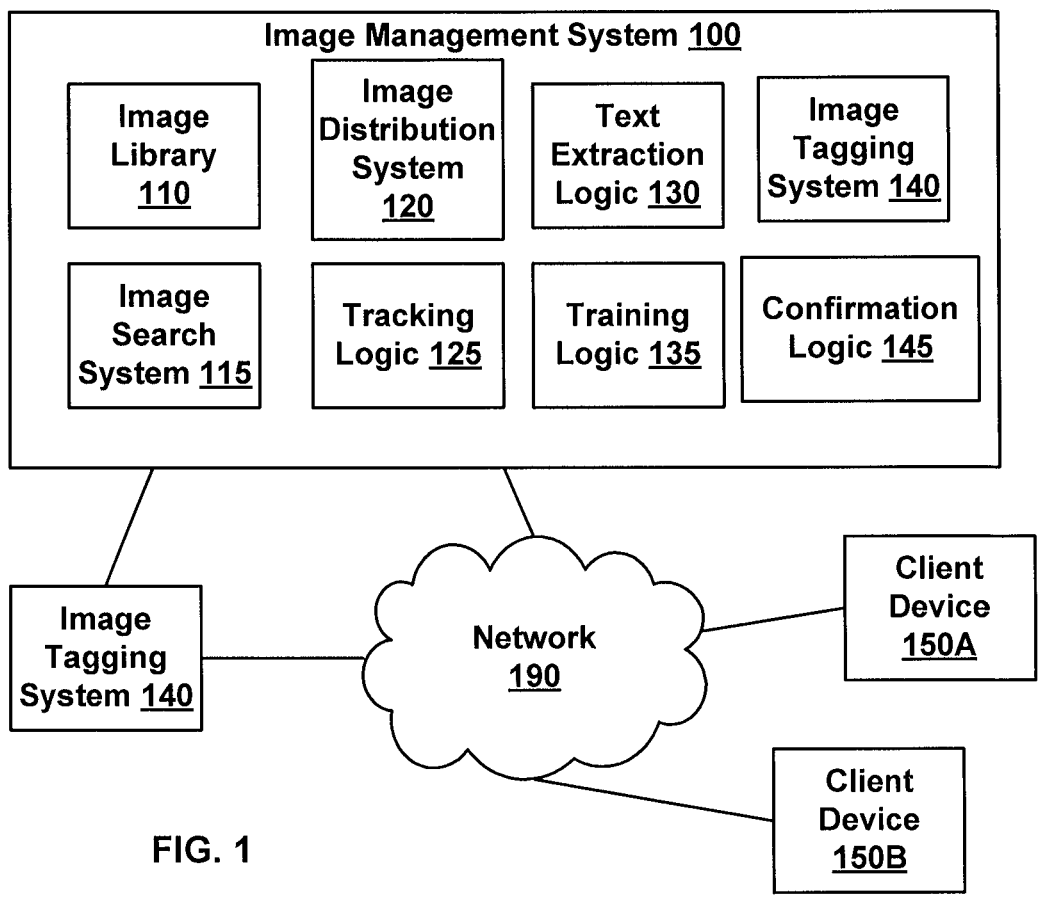
FIG. 1 illustrates an image management system according to various embodiments of the invention.

FIG. 1 illustrates an Image Management System 100, according to various embodiments of the invention. The elements of Image Management System 100 are optionally distributed among a plurality of computing devices. Image Management System 100 includes an Image Library 110. Image Library 110 is a library of images that may be used freely or used in exchange for payment of a fee or other consideration. Such libraries of images are sometimes provided and/or managed by third-party image distributors such as Getty Images and are, thus, optionally external to Image Management System 100. The images within Image Library 110 are optionally tagged with words or other tokens representative of the contents of the images. These tags may be provided by a source of the images, e.g. a photographer. Alternatively, the tags may be provided by a special purpose image tagging system, such as that described in U.S. Pat. No. 9,665,595 and other patents or patent applications cited herein. Tags may include words such as "cat" or "stapler." Alternatively, tags may include an attribute vector generated by a machine learning system. Image Library 110 may include more than one library of images, from different image sources.

Image Management System 100 includes an Image Search System 115. Image Search System 115 is configured for a third party to select a first image from the library of images. For example, Image Search System 115 may be configured for a creator of multimedia content to search for image that match the creator's specific needs for content that includes text, and to which the searched for image is to be added. Image Search System 115 includes a trained neural network. This neural network is trained using Training Logic 135, as discussed elsewhere herein.

The neural network is trained to receive search text and to facilitate selection of one or more images from Image Library 110 based on the received search text. The received search text can include more than just a few key words, for example it can include entire phrases, sentences, paragraphs or larger blocks of text. Image Search System 115 is configured to identify images that are likely to be used in conjunction with specific text in multimedia.

The search text may include a subset of text in multimedia content. As such, different parts of the text within the multimedia content may be used to search for different images. Image Search System 115 is optionally configured to structure, tokenize, and/or apply a natural language processor to the search text prior to using the text to search for images. The natural language processor is optionally included as part of the neural network of Image Search System 115 or as part of an external neural network. In an illustrative example, a publisher of multimedia may provide a paragraph of text to Image Search System 115. This text is tokenized or vectorized using a natural language processor and the tokens are provided to Image Search System 115. The output of Image Search System 115 is optionally an attribute vector that may be used to search for images within Image Library 110. The attribute vector can include representations of image features, keywords, ownership, size, source, date, location, resolution and pixel depth, and/or the like. For example, in some embodiments an attribute vector may include feature vectors extracted using a neural network and/or standard algorithms such as SURF, ORB, SIFT, BRIEF or KAZE. Such features vectors can include many descriptors. As used herein, the term "attribute vector" is intended to include "feature vectors" as understood in the art (e.g., see https://brilliant.org/wiki/feature-vector/) and also other attributes of the image or sequence of images.

In some embodiments, Image Search System 115 is configured to search for images using both keywords and larger blocks of text. For example, keywords may first be used to select a set of images by matching the keywords to image tags. Then larger segments of text and the neural network may be used to identify a subset of the set of images. For example, "Chevy Volt" may be used to select a set of images including a specific car model. The selected set may then be further filtered using an entire paragraph of text to identify one or more images of a Chevy Volt appropriate for the paragraph. Alternatively, the larger segments of text and neural network may be applied first and then keywords and image tags used to further narrow the search results. Optionally, searches based on keywords are made using a simple matching algorithm while searches based on larger segments of text are made using a neural network.

The neural network of Image Search System 115 is configured to receive text and to output a set of image features (e.g., an attribute vector or feature vector) that characterize an image that would be a good match to the text. These image features are then used to search for images having similar features. Specifically, in some embodiments, the neural network of Image Search System 115 is configured to receive text as input. This text may optionally have been pre-processed to identify structural elements and tokens. The received text is used to generate a corresponding set of image features, which can be used to search for matching images.

In various embodiments, the neural network is also configured to additionally receive an image. This image may optionally have been pre-processed to identify objects, structures, and/or features within the image (e.g., an attribute vector or feature vector). In these embodiments, the output of the neural network is optionally a value representative of a match between the image and the text.

Image Management System 100 optionally further includes an Image Distribution System 120. Image Distribution System 120 is configured for delivering selected images to third parties. An example of Image Distribution System 120 includes image subscription services, such as those offered by Getty Images, Inc. Image Distribution System 120 may further include an image search interface in which a user can provide text, an image, and/or image features to Image Search System 115. The text may be provided by providing a link or URL pointing to the text, by entering the text in an input field, by uploading a file, and/or the like. Parts of Image Distribution System 120 are optionally external to Image Management System 100.

Image Distribution System 120 is optionally configured to add a unique identifier to distributed images and/or to request an address of multimedia content that will include distributed images. For example, Image Distribution System 120 may be configured to add a digital watermark to an image. The watermark being configured to identify the image. In some embodiments, images may be licensed for use with specific identifiable multimedia, e.g., an addressable blog or website.

Image Management System 100 optionally includes Tracking Logic 125 configured to track inclusion of the selected first image in multimedia content. The multimedia content including both the tracked image and text associated with the image. The associated text may be text used to select the image and/or text with which the image is associated by being published together in multimedia content. For example, Tracking Logic 125 may identify text that has been associated with an image by a multimedia publisher. This association may then be used to further train a neural network included in Image Search System 115.

Tracking Logic 125 may operate by searching the internet for the first image and the text, by detecting the unique identifier, by receiving a link or URL from a third party, and/or the like. In some embodiments, Tracking Logic 125 is configured to manage one or more web crawlers configured to look for images on the internet. The web-crawlers and/or Tracking Logic 125 are optionally configured to confirm that images are used according to terms of a license and/or to identify associations between text and images that can be used to train a neural network of Image Search System 115. Associations used for training need not include images tracked using an image identifier. For example, Tracking Logic 125 may merely include a web-crawler configured to identify multimedia internet content suitable for neural network training.

Image Management System 100 optionally further includes Text Extraction Logic 130 configured to extract text from multimedia content found to include images identified and/or tracked using Tracking Logic 125. For example, if an image is found on a specific blog or website, Text Extraction Logic 130 may extract the text and from that blog or website. Text Extraction Logic 130 is optionally configured to identify a subset of the text most closely associated with the image. For example, Text Extraction Logic 130 may be configured to identify text within a website that specifically refers to the image, and/or text disposed proximate to the image or proximate to text that refers to the image. In one embodiment, Text Extraction Logic 130 is configured to identify text that refers to the image and then extract an entire paragraph including that text, or 1-5 sentences adjacent to the reference. In an illustrative example, a webpage devoted to laptop computer design may have descriptions of different features such as screen brightness, battery life, keyboard design, etc. Text Extraction Logic 130 may be configured to identify and extract text within this webpage relating specifically to keyboard design and associated with an image of a keyboard. Text Extraction Logic 130 is optionally configured to use image tags to facilitate this identification.

Image Management System 100 includes Training Logic 135 configured to train the neural network to facilitate selecting an image based on text and/or to generate a value indicating how well an image matches a text. The training is intended to improve the ability of the neural network to identify images that are most likely to be used in association with the text. The training occurs by providing Training Logic 135 with images and samples of associated text. Optionally, the training is performed by providing images found in association with text on websites, blogs or other internet sources. For example, an image provided by Distribution System 120 may subsequently by found (using Tracking Logic 125) in multimedia posted on the Internet. Text within this multimedia is extracted using Text Extraction Logic 130. The extracted text and the associated image are then used by Training Logic 135 to train the neural network, which may be included in Image Search System 115. A goal of the training may be to evolve the neural network to generate attribute vectors and/or feature vectors that better match those of an associated image.

Thus, in some embodiments, Image Management System 100 is configured to train a neural network by tracking or identifying use of images on the internet or other networks, identifying text used in association with tracked or identified images, and use the associated identified text and images for the training of a neural network.

Image Management System 100 optionally includes an Image Tagging System 140 configured to associate image tags with images within the image library. These image tags can include keywords, attributed vectors and/or feature vectors, and are optionally used in the search for images within Image Library 110 as described elsewhere herein. Image Tagging System 140 is optionally external to Image Management System 100. Image Tagging System 140 optionally includes one or more of the systems described in U.S. Pat. Nos. 9,665,595, 9,959,467, 9,639,867, 9,830,522, 9,575,995, 9,569,465 and continuations (or continuations in part) thereof. The disclosures of these patents and patent applications are hereby incorporated herein by reference.

Image Management System 100 optionally further includes Confirmation Logic 145. Confirmation Logic 145 is configured to determine if the inclusion of an image tracked/found in the multimedia content is authorized. For example, if an image from Image Library 110, tracked by Tracking Logic 125, includes a unique identifier and is found in a particular website, Confirmation Logic 145 may confirm that the inclusion in the website is not in violation of a license or use agreement.

A Network 190 may be used to provide communication between Image Management System 100, third party Client Devices 150, and/or external embodiments of Image Tagging System 140. Network 190 can include the internet, local area networks, private networks, wireless networks, cellular networks, and/or the like. Client Devices 150 are individually designated 150A, 150B, etc.

Figure 2:
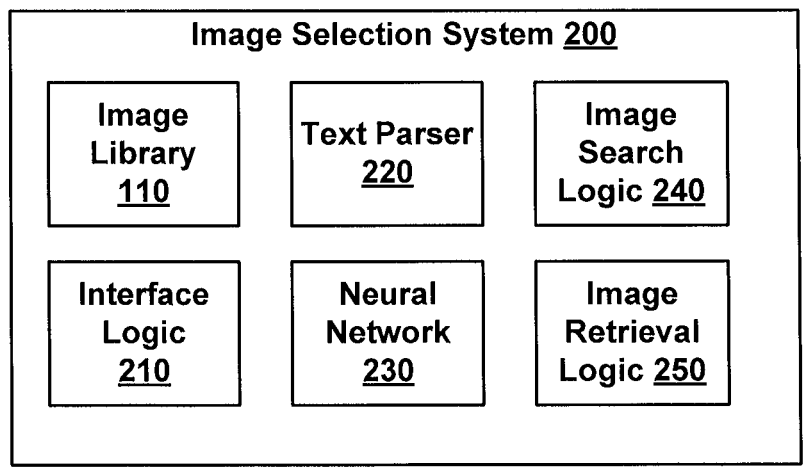
FIG. 2 illustrates an image selection system, according to various embodiments of the invention.

FIG. 2 illustrates an Image Selection System 200, according to various embodiments of the invention. Image Selection System 200 is configured for selecting an image from a library of images, such as Image Library 110. The selection is based on received text used to generate an output of a neural network. Optionally, the selection is further based received keywords. For example, keywords may be used to first select an initial set of images from Image Library 110 and then a subset of this initial set may be selected using a greater amount of text and the neural network. The neural network is optionally trained using Image Management System 100.

Image Selection System 200 includes Image Library 110 discussed elsewhere herein, or access thereto. Images within Image Library 110 are optionally stored in association with attribute vectors, image feature vectors, keywords, and/or the like. Image Library 110 may be managed by a third party and/or images therein may be subject to license terms.

Image Selection System 200 includes an Interface Logic 210 configured to receive search text from a user. The search text may be received via a text input field, a text editor or automatically from a multimedia publishing application. The received text can include a phrase, (e.g., a phrase of at least 3, 5 or 10 words such as a title or caption), a sentence, two or more sentences, a paragraph (e.g., two or more related sentences), a chapter, an article, a webpage, and/or the like. In some embodiments, Interface Logic 210 is further configured to receive one or more keywords, separate from the search text. Interface Logic 210 is optionally configured to provide a user interface to a user, the user interface being configured for the user to provide text and/or keywords. The user interface may also be configured for the user to select an image from among one or more images retrieved from Image Library 110. In some embodiments the user interface includes controls configured to perform steps automatically. For example, to automatically select one or more images based on text provided by the user, and present the one or more images to the user. The user interface may include a control configured for the user to identify a location within text for placement of one or more retrieved images.

For example, Interface Logic 210 may have a text field to receive the full paragraph:

The cloud of white smoke became slightly thicker as it was forced from the inner depths of his lungs, out across his lips, and into the cool night air of Port Rotterdam, Admiral Cor Boonsrta, a tall man with grey-streaked hair, paced slowly up and down a ten-meter stretch of the old wooden pier, studying the lines of the anchored cargo ships, drawing deeply on a Player's cigarette as he waited for Rob Kypers to arrive.

And also texts fields to receive 1-5 keywords, such as "Fog," "Harbor" and "Night." As described further elsewhere herein, The keywords "Fog," "Harbor" and "Night" may be used to select an initial set of images being associated with similar image tags, the full paragraph may then be used to select images from this initial set using a neural network trained using Image Management System 100.

In some embodiments, Interface Logic 210 includes a plugin to a text editor, web publishing tool, and/or the like. In these embodiments, text greater than a few keywords may be automatically received by Interface Logic 210. For example, a block of text may be highlighted and sent to Interface Logic 210 using a right-click menu.

Image Selection System 200 optionally further includes a Text Parser 220 configured to parse text received from a user via Interface Logic 210. In some embodiments Text Parser 220 is configured to identify tokens with text, e.g., specific words or phrasings, punctuation, structures, and/or and other objects used in natural language processing that could be used to interpret the meaning of text. Text Parser 220 may be configured to generate a text feature vector representative of the content and/or meaning of the text, and/or to generate a set of tokens representative of the received text.

Image Selection System 200 further includes a Neural Network 230 configured (e.g., trained) to receive an input based on text and/or keywords, received from Interface Logic 210. Neural Network 230 may be configured to receive as input, unaltered text, tokens representative of the received text, text tokenized using Text Parser 220, text feature vectors generated using Text Parser 220, keywords, and/or the like. Neural Network 230 may be configured to receive text including more than one sentence. Neural Network 230 is optionally trained using Image Management System 100 and/or using methods described herein.

Output of Neural Network 230 can include keywords, an image feature vector, and/or other criteria by which images may be characterized and/or searched for. As such, in some embodiments, Neural Network 230 is configured to convert a text feature vector to an image feature vector.

Image Selection System 200 further includes Image Search Logic 240. Image Search Logic 240 is configured to search Image Library 110 for desired images, typically using Neural Network 230. This search may be incremental and may be based on any of the possible inputs to Neural Network 230. For example, Image Search Logic 240 may be configured to identify a set of images within Image Library 110 by providing text as an input to Neural Network 230 and receiving back therefrom an image feature vector. The received image feature vector is then compared with image feature vectors associated with images within Image Library 110. Those images whose image feature vectors are the closest match to the received image feature vector are then identified as output of Image Search Logic 240.

Image Search Logic 240 may be configured to perform an incremental search in which a first set of images are selected/identified using a first criteria and a subset of this first set of images is then selected/identified using a second criteria. The first and second criteria can include any combination of keyword, attribute vector, image feature vector, classification, or the like. For example, the first criteria may include images that are royalty free and match the keyword "feather," while the second criteria may include an image feature vector generated from a text feature vector using Neural Network 230. The second set of criteria may include a greater amount of text than the first set of criteria. For example, the first criteria may include one or more keywords and the second set of criteria may include a phrase including at least three words having a greater amount of text than the one or more keywords.

The image feature vectors associated with images within Image Library 110 may be calculated prior to receipt of the image feature vector from Neural Network 230 and stored in association with the respective images, or may be calculated in response to receipt of the image feature vector from Neural Network 230 and stored temporarily. For example, if keywords are first used to select an initial set of images within Image Library 110, the image feature vectors of these images may be calculated after selection of the initial set.

Image Selection System 200 further includes Image Retrieval Logic 250. Image Retrieval Logic 250 is configured to retrieve selected/identified images from Image Library 110 and provided the retrieved images to a user. For example, the images may be provided to a multimedia publishing tool. One, two or more images may be retrieved at time. In some embodiments, retrieval of an image requires payment of a license.

In various embodiments, Image Selection System 200 optionally further includes Image Distribution System 120, Image Tagging System 140 and/or Confirmation Logic 145. One or more elements of Image Selection System 210 are optionally included in Image Management System 100.

FIG. 3 illustrates a method of managing images, according to various embodiments of the invention. These methods include two phases, which are optionally performed separately. In a first phase, a neural network is trained based on actual use of images in association with text in published multimedia. In a second phase, the trained neural network is used to search for images based on text as a search input. The search input can include a phrase including three or more words, at least a sentence, paragraph or larger block of text. The search input optionally further includes one or more keywords. Images identified and selected as a result of the search are intended to be suitable, e.g., desirable or preferred, for inclusion in multimedia along with the text search input.

In an optional Provide Image Step 310 an image is provided to a third party, e.g., to a publisher of multimedia. The provided image may be provided from a commercial image source such as Getty Images or ShutterStock®. Provide Image Step 310 can include tracking use of the provided image within published multimedia. For example, the provided image may include a unique identifier and this identifier may be detected within the published multimedia by a web crawler.

In an Identify Multimedia Step 320, multimedia including text and an image is identified. This multimedia may be published on a website, blog, article, advertisement, or the like. The image may be one provided in Provide Image Step 310 or be an image from some other source. For example, in Identify Multimedia Step 320, a web crawler may be used to search for multimedia content including both text and one or more images associated with the text. The text associated with the image preferably includes at least a phrase including at least three, five or 10 words, a sentence, paragraph or larger block of text. In some examples, the text associated with an image includes a caption or a title, or is included within a paragraph disposed proximate to the image within the multimedia. Identify Multimedia Step 320 includes retrieval of both text and at least one image associated with the text, from the multimedia.

In an optional Apply NLP (natural language processing) Step 330, the retrieved text is processed, for example using Text Extraction Logic 130. The result of this processing can include identification of structures, tokens or objects within the text, or other characteristics of the text as may be produced by natural language processing of the text. In some embodiments, Apply NLP Step 330 includes generation of an attribute vector or text feature vector characterizing the retrieved text. This is optionally accomplished using a neural network or Text Parser 220.

In a Train Step 340, a neural network, e.g., Neural Network 230, is trained using the retrieved image and associated text. The training is optionally accomplished using Training Logic 135. The associated text may have been processed in Apply NLP Step 330 or may be used unaltered. In some embodiments, Train Step 360 includes determining an image feature vector for the retrieved image. Training of the neural network can then proceed by providing the associated text (or a representative thereof) as an input to the neural network and then adjusting coefficients/weights of the neural network such that the output of the neural network matches the image feature vector of the retrieved image. This process may be repeated for a large number of image/text pairs so as to train the neural network to produce an output that can be used to identify images suitable for use in association with text in multimedia.

In a Receive Text Step 350, text is received from an external source. The received text can include a phrase including three or more words, at least a sentence, paragraph or larger block of text. The text may be received from a remote client, such as Client Device 150A, and/or from a multimedia publishing application. The text may be received via Network 190.

Receive Text Step 350 optionally further includes separately receiving keywords from the external source.

In a Search Step 360, the text, and optionally keywords, received in Receive Text Step 350 are used to search for one or more images, the images being suitable for use with the received text in multimedia. For example, if the received text includes "The cloud of white smoke became slightly thicker as it was forced from the inner depths of his lungs," an appropriate image may include an image of smoke in lungs or a person blowing smoke. If keywords "dock" and "ship" are also received in Receive Text Step 350, then an appropriate image may include one that includes a person smoking on a dock.

Search Step 360 is optionally performed using Image Search Logic 240, and can include application of Apply NLP Step 330 to the text received in Receive Text Step 350. Specifically, Search Step 360 optionally includes conversion of the received text into a text feature vector using Text Parser 220, providing the text feature vector to Neural Network 230 to generate an image feature vector, and searching Image Library 110 for images that match the image feature vector using Image Search Logic 240.

In a Provide Step 370, one or more images selected/identified in Search Step 360 are provided to a remote destination, e.g., Client Device 150A and/or the source of the text received in Receive Text Step 350. Provide Step 370 is optionally performed using Image Retrieval Logic 250.

Receive Text Step 350, Search Step 360 and Provide Step 370 are optionally performed independently from other steps of FIG. 3. For example, Steps 310-340 are optional if a trained instance of Neural Network 230 is available.

Image Search System 115, Image Distribution System 120, Image Tagging System 140 and Image Selection System 200 include hardware, firmware and/or software stored on a non-transient computer readable medium. Likewise, the "logic" disclosed herein includes hardware, firmware and/or software stored on a non-transient computer readable medium. This logic may be implemented in an electronic circuit to produce a special purpose computing system.

Several embodiments are specifically illustrated and/or described herein. However, it will be appreciated that modifications and variations are covered by the above teachings and within the scope of the appended claims without departing from the spirit and intended scope thereof. For example, while the examples provided herein are focused on using text as a search input to identify images suitable for use with the text, in alternative embodiments a first image may be used as the search input to identify additional related images. In these embodiments, two or more image feature vectors may be provided to Neural Network 230 and an image feature vector that is a convolution of the inputs is generated as output. This output can be used to search Image Library 110 for additional images. The images discussed herein are optionally included within a video. An image feature vector may include relationships between images in a sequence.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access' memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. An image management system comprising:
a library of images;
an image search system configured for a third party to select a first image from the library of images, the image search system including a neural network;
an image distribution system configured for delivering the selected first image to the third party;
tracking logic configured to track inclusion of the selected first image in multimedia content, including both the selected first image and first text;
text extraction logic configured to extract the first text from the multimedia content; and
training logic configured to train the neural network to select a second image based on second text, the training being based on an association between the extracted first text and the first image.

2. The system of claim 1, wherein the image search system is further configured to select the first image based on a keyword provided by the third party, and a match between the keyword and an image tag associated with the first image.

3. The system of claim 1, wherein the first image is associated with one or more image tags and an image feature vector.

4. The system of claim 1, further comprising an image tagging system configured to generated image tags based on content of the first image.

5. The system of claim 1, wherein the tracking logic is further configured to search the internet to identify use of the first image.

6. The system of claim 1, further comprising confirmation logic configured to determine if inclusion of the first image in the multimedia content is authorized.

7. The system of claim 1, wherein the text extraction logic is further configured to identify a subset of text in the multimedia content most closely associated with the first image, the multimedia content including more than one image.

8. An image management system comprising:
a library of images;
an image search system configured to select a first image from the library of images, the image search system including a neural network;
tracking logic configured to identify one or more images included in multimedia content and to identify a subset of text within the multimedia content associated with the identified images;
text extraction logic configured to extract the subset of text from the multimedia content; and
training logic configured to train the neural network to select a second image based on second text, the training being based on an association between the extracted subset of text and the one or more images included in the multimedia content, wherein the neural network is trained to generate an attribute vector based on a text input.

9. The system of claim 8, wherein the neural network is configured to receive the subset of text as input and to generate an image feature vector as an output in response to this input, the library of images being searchable using the image feature vector.

10. The system of claim 9, wherein the library is searchable using both the image feature vector and keywords.

11. The system of claim 8, further comprising the neural network, wherein the image search system is configured to search the library of images using at least an image feature vector generated by the neural network in response to received text, the search resulting in identification of one or more images within the library of images; and
image retrieval logic configured retrieve the one or more images from the library of images.

12. The system of claim 11, wherein the image search system is further configured to search the library of images using keywords to identify a set of images and the one or more identified images are a subset of the set of images.

13. A method of providing images, the method comprising:
identifying text associated with an image within published multimedia, the text including at least a sentence, paragraph or larger block of text;
using the image and identified text to train a neural network, the neural network being trained to produce an output usable to identify images suitable for use in multimedia, the use being in association with text within the multimedia;
receiving a text input from an external source;
searching for one or more images using the trained neural network, based on the received text input; and
providing one or more images identified in the searching to the external source.

14. The method of claim 13, further comprising providing the image to a third party and tracking use of the image by the third party within the published multimedia.

15. The method of claim 13, further comprising applying a natural language processor to identify or characterize parts of the identified text to generate a text feature vector.

16. The method of claim 13, further comprising receiving keywords from the external source, wherein searching for the one or more images further includes using the keywords to identify the one or more images.

17. The method of claim 13, wherein searching for the one or more images includes generating an image feature vector from the received text input and comparing the generated image feature vector to stored image feature vectors associated with images included in an image library.

18. The method of claim 13, wherein searching for the one or more images includes generating a text feature vector from the received text input and providing the text feature vector to the trained neural network.

19. The method of claim 13, wherein the image is part of a video.

* * * * *